US011253093B1

(12) United States Patent
Cunningham et al.

(10) Patent No.: US 11,253,093 B1
(45) Date of Patent: Feb. 22, 2022

(54) HAT HANGER

(71) Applicant: Classic Décor Ltd., Bowling Green, MO (US)

(72) Inventors: Christopher Eric Cunningham, Lake St. Louis, MO (US); Mark David Cunningham, Lake St. Louis, MO (US)

(73) Assignee: Classic Décor Ltd., Bowling Green, MO (US)

( * ) Notice: Subject to any disclaimer, the term of this patent is extended or adjusted under 35 U.S.C. 154(b) by 101 days.

(21) Appl. No.: 16/459,481

(22) Filed: Jul. 1, 2019

Related U.S. Application Data

(60) Provisional application No. 62/694,986, filed on Jul. 7, 2018.

(51) Int. Cl.
*A47G 25/10* (2006.01)
*A47F 7/06* (2006.01)

(52) U.S. Cl.
CPC ............... *A47G 25/10* (2013.01); *A47F 7/06* (2013.01)

(58) Field of Classification Search
CPC .................................. A47G 25/10; A47F 7/06
USPC ............................................................ 224/275
See application file for complete search history.

(56) References Cited

U.S. PATENT DOCUMENTS

| 330,434 | A | | 11/1885 | Spielman | |
|---|---|---|---|---|---|
| 1,049,971 | A | * | 1/1913 | Appleby | A47G 25/10 248/303 |
| 1,393,843 | A | * | 10/1921 | Smith | B23Q 35/102 211/32 |
| 1,990,211 | A | * | 2/1935 | Stinson | A47G 25/24 223/88 |
| 1,992,359 | A | * | 2/1935 | Didge | A47G 25/10 211/30 |
| 2,043,620 | A | * | 6/1936 | Hoffman | A47G 25/10 211/31 |
| 2,146,109 | A | * | 2/1939 | Curtis, Jr. | A47G 25/10 223/66 |

(Continued)

OTHER PUBLICATIONS

Hard Hat Holder [online]. Rauckman Utility Products, Jun. 17, 2019. Retrieved from the Internet: <https://www.amazon.com/Rauckman-Utility-Products-Hard-Holder/dp/B07G2P4Z1G/ref=pd_Ipo_ sbs_469_img_0?_encoding=UTF8&psc=1&refRID=J6GPFJAC4P7MQHK6EATX>.

(Continued)

*Primary Examiner* — Justin M Larson
*Assistant Examiner* — Lester L Vanterpool
(74) *Attorney, Agent, or Firm* — Creativenture Law, LLC; Dennis Jm Donahue, III; Kevin Staed

(57) ABSTRACT

A hat hanger has a hook, an L-shaped arm, and a J-shaped open loop, and the arm and loop are in different planes. The arm's proximal section connects to the hook's shank and extends to a bend in the arm opposite from the hook's head, and the arm's distal section extends from the bend to the arm's distal end. The loop's neck connects to the arm's distal section its distal end and is angled out of the plane of the arm to the plane of the loop which is defined by the loop's curved crown section that extends from the neck and turns inwardly back toward the proximal end of the arm. The nose is situated at an end of the curved crown section opposite the neck and spaced from the arm. The loop's neck, nose, and curved crown section bound an interior space which receives the hat's crown portion.

20 Claims, 3 Drawing Sheets

(56) References Cited

U.S. PATENT DOCUMENTS

| | | | | | |
|---|---|---|---|---|---|
| 2,177,546 | A | * | 10/1939 | Johnson | A47G 25/10 223/66 |
| 2,341,643 | A | * | 2/1944 | Mincenberg | A47G 25/10 223/66 |
| 2,538,237 | A | * | 1/1951 | Efner | B60R 7/10 211/31 |
| 2,574,557 | A | * | 11/1951 | Goodhand | A47G 25/743 211/30 |
| 2,626,712 | A | * | 1/1953 | Frush | A47G 25/10 211/32 |
| 2,633,246 | A | * | 3/1953 | Guthrle | A47G 25/10 211/32 |
| 2,640,594 | A | * | 6/1953 | Lesikar | A47G 25/10 211/32 |
| 2,643,773 | A | * | 6/1953 | Nicholson | A47G 25/10 211/32 |
| 2,670,084 | A | * | 2/1954 | Evans | A47G 25/10 211/32 |
| 2,720,984 | A | * | 10/1955 | Gotowka | A47G 25/10 211/30 |
| 2,889,935 | A | * | 6/1959 | Thornburg | A47G 25/10 211/30 |
| 2,916,149 | A | * | 12/1959 | Behrendt | B60R 7/10 211/31 |
| 3,208,597 | A | * | 9/1965 | Hansen | A47G 25/10 211/32 |
| D256,738 | S | * | 9/1980 | Dockery | D3/328 |
| 4,461,386 | A | * | 7/1984 | Turner | G11B 33/0472 118/500 |
| 4,757,905 | A | * | 7/1988 | Green | A47F 7/06 211/31 |
| 4,821,891 | A | * | 4/1989 | Williams | A47G 25/10 211/181.1 |
| 5,033,660 | A | * | 7/1991 | Kelly | A47G 25/10 223/85 |
| 5,169,007 | A | * | 12/1992 | McHendry | A47F 7/06 211/119 |
| D346,700 | S | * | 5/1994 | Weinhold | D6/317 |
| 5,317,788 | A | * | 6/1994 | Esposito | B62J 7/08 24/300 |
| 5,772,049 | A | * | 6/1998 | Randone | A47F 7/06 211/30 |
| 6,014,794 | A | * | 1/2000 | McCoy | B62J 7/08 24/265 H |
| 6,116,481 | A | * | 9/2000 | Arnold | A47G 25/10 223/1 |
| 6,349,862 | B1 | * | 2/2002 | Smith | A47G 25/10 223/24 |
| D506,076 | S | * | 6/2005 | Weisgerber | D6/317 |
| D561,007 | S | * | 2/2008 | Kaesler | B60P 7/0846 D8/354 |
| D570,256 | S | * | 6/2008 | Tucker | D12/133 |
| 7,458,135 | B2 | * | 12/2008 | Mikesell | B25H 3/006 24/300 |
| 7,500,586 | B2 | | 3/2009 | Oliveira-Martinez | |
| 7,805,816 | B1 | * | 10/2010 | Thorne, III | B60P 7/0823 24/301 |
| D673,781 | S | * | 1/2013 | Clarke | D6/317 |
| D708,447 | S | * | 7/2014 | Goodman | D6/323 |
| 9,457,732 | B2 | * | 10/2016 | Qian | B60R 11/02 |
| 9,586,529 | B1 | * | 3/2017 | Sanchez | B60R 7/10 |
| 2012/0167351 | A1 | * | 7/2012 | Ashliman | B60P 7/0823 24/301 |
| 2013/0037672 | A1 | * | 2/2013 | Sanchez | B60R 7/10 248/303 |
| 2014/0021230 | A1 | * | 1/2014 | Sanchez | B60R 7/10 224/275 |
| 2015/0183379 | A1 | | 7/2015 | Hensley | |
| 2019/0009728 | A1 | | 1/2019 | Sharon et al. | |

OTHER PUBLICATIONS

Coat Rack for Car Seat [online]. Organize-It, Jun. 17, 2019. Retrieved from the Internet: <https://www.organizeit.com/coat-rack-for-car-seat.asp>.

GCIYAEN Mount & Holders [online]. Jun. 17, 2019. Retrieved from the Internet: <https://www.amazon.com/Mount-Holders-Stainless-Universal-Automobile/dp/B079JPGC1Z/ref=pd_bxgy_328_img_3/140-5127190-2788335?_encoding=UTF8&pd_rd_i=B079JPGC1Z&pd_rd_r=2d816c84-9118-11e9-a051-873e6f0a290b&pd_rd_w=0cC0S&pd_rd_wg=0DLqy&pf_rd_p=a2006322-0bc0-4db9-a08e-d168c18ce6f0&pf_rd_r=2C0351P0KSHECNZNGK4D&psc=1&refRID=2C0351P0KSHECNZNGK4D>.

* cited by examiner

HAT HANGER

CROSS-REFERENCE TO RELATED APPLICATIONS

This application claims priority from U.S. Provisional Patent Application No. 62/694,986 filed on Jul. 7, 2018.

STATEMENT REGARDING FEDERALLY SPONSORED RESEARCH

Not Applicable.

APPENDIX

Not Applicable.

BACKGROUND OF THE INVENTION

Field of the Invention

The present invention relates to hat hangers, and more particularly to hat hangers that can be mounted to vehicle seats and/or to walls.

Related Art

As evidence from U.S. Pat. No. 330,434, hat hangers have been in existence and improved upon since before the passenger motor car had been invented. Further improvements have included the innovation of a hat hanger with a single hook and a closed hoop that are formed from a single strand of wire as documented in U.S. Pat. No. 2,341,643. Another innovation disclosed in U.S. Pat. No. 2,643,773 is for hat hangers held that are by a bracket mounted to a wall and can have alternative arrangements for hanging the hat: in one orientation of the hat hanger, a closed hoop extends downwardly from the bracket so that the hat is held adjacent to the wall with the brim held between the closed hoop and the wall; in an alternative orientation of the hat hanger, the closed hoop extends outwardly away from the wall so that the crown of the hat can be placed upside-down within the closed hoop. A number of hat hanger innovations have been particularly directed to hat hangers that are mounted within vehicles: U.S. Pat. Nos. 2,538,237; 2,916,149, and 9,586,529.

Even with all of these innovations in hat hangers, it remains a common problem for hat wearers to have trouble wearing and properly storing a hat while in a vehicle. Some of the more simple hat hangers that have a single hook and do not require any type of mounting do not satisfactorily hold the hats so the hats fall out of the hat hanger while the vehicle is in motion. Other hat hangers that more securely hold the hat require more complicated installations in the vehicle or are fully integrated into the seats and do not allow the hat hanger to be used with a wall bracket in a home or workplace. Due to some of these hat hanger complexities, the hat hangers also are more expensive than most hat wearers want to spend. Accordingly, many hat wearers resort to putting their hats on the dash of the vehicle or on a seat which causes problems for visibility and passenger space and could damage the shape of the hat.

There remains a desire for a hat hanger that is not complicated to install in a vehicle but securely holds the hat while the vehicle is moving. There is also a desire for a hat hanger that can be easily removed from the vehicle or repositioned in the vehicle and preferably can be used interchangeably in a vehicle and at a home and/or workspace.

SUMMARY OF THE INVENTION

In one aspect of the present invention for a hat hanger, the hat hanger has a hook, an arm, and a loop. The arm is situated in one plane, and the loop is situated in another plane. The hook has a shank section, a tip section, and a head situated between the shank section and the tip section. The arm has a proximal section, a distal section, and a bend between the proximal section and the distal section; the proximal section is connected to the shank section of the hook and extends to the bend in the arm opposite from the head of the hook, and the distal section of the arm extends from the bend to a distal end of the arm. The loop has a neck, a nose, and a curved crown section situated between the neck and the nose; the neck is connected to the distal section of the arm at the distal end and is angled out of the plane of the arm to the plane of the loop which is defined by the curved crown section that extends from the neck and turns inwardly back toward the proximal end of the arm, and the nose is situated at an end of the curved crown section opposite from the neck. The neck, the nose, and the curved crown section bound an interior space which receives the crown of the hat, but the nose of the loop does not connect back with the arm and instead provides an open space between nose and the arm.

In another aspect of the invention, the hat hanger can be mounted directly to the headrest posts of a vehicle seat without any fasteners required or can be mounted to any seat with an elastic strap with clasps at the ends of the strap. The elastic strap wraps around the seatback and the clasps respectively connect and hold the hat hanger in place by the hook and bend in the arm. The hat hanger can alternatively be mounted to a bracket that is secured to a wall by fasteners, without any fasteners required between the hat hanger and the mounting bracket. With the mounting bracket, the hat hanger and be oriented so that the loop extends downwardly adjacent to the wall or extends outwardly away from the wall. In yet another aspect of the invention, the hat hanger is formed from a single, continuous solid strand of wire.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
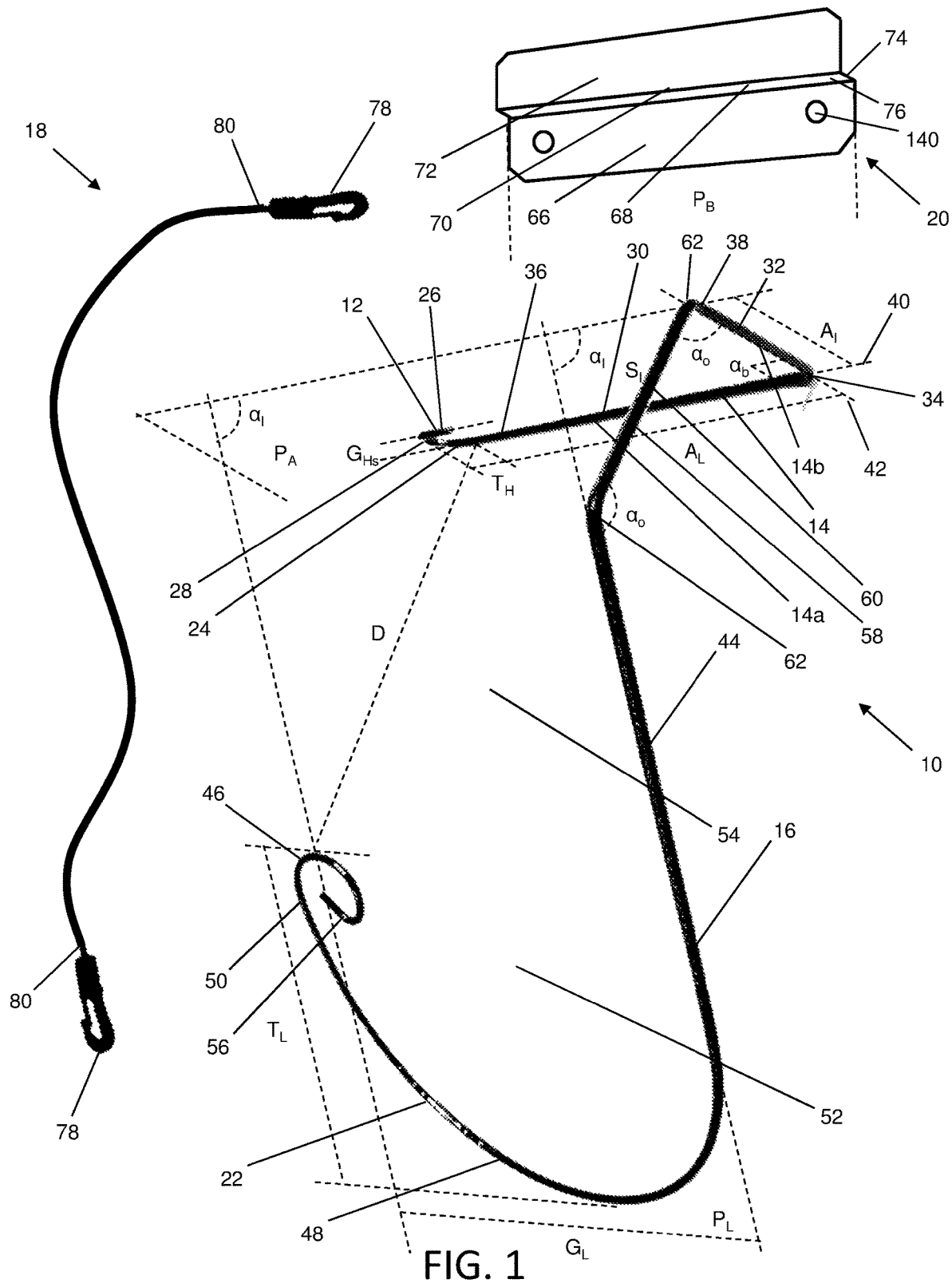
FIG. 1 illustrates a front perspective view of a hat hanger according to a first embodiment along with alternative mounts, an elastic strap for a seat and a mounting bracket for a wall.

The primary elements of the hanger 10 for a hat 100 with mounting devices for the hanger according to the present invention are shown in FIG. 1. Generally, the hat hanger 10 is formed with a hook 12, an L-shaped arm 14, and a J-shaped open loop 16. The curved crown section 48 of the loop holds the hat while the hook and arm are used to mount the hat hanger. The hook's shank section 24 is connected to the longer end of the arm, i.e., at the proximal end of the longitudinal portion 14a away from the arm's lateral portion 14b. The loop's neck 44 extends from the curved crown and connects with the arm's lateral portion through an angled segment such that the L-shaped arm is in one plane ($P_A$), and the loop is in another plane ($P_L$) that intersects the arm's plane at an interior angle ($\alpha_1$).

Figure 2:
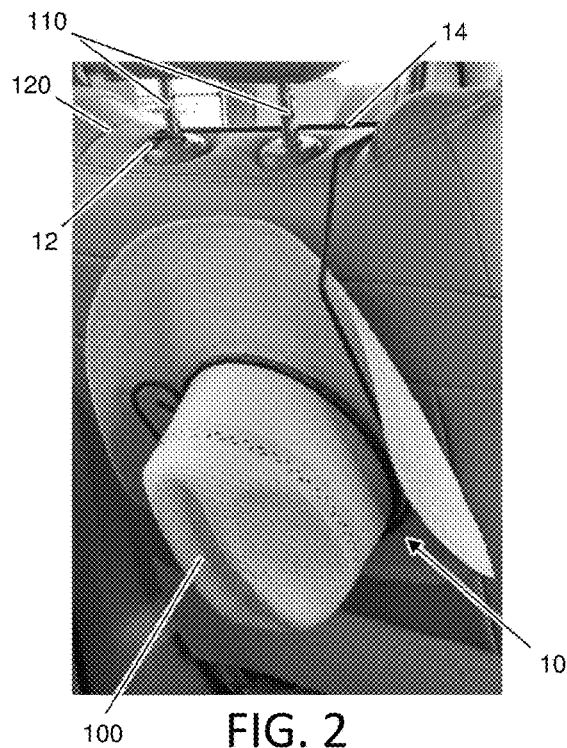
FIG. 2 illustrates the hat hanger of FIG. 1 mounted to the headrest posts of a vehicle seat.
Figure 3:
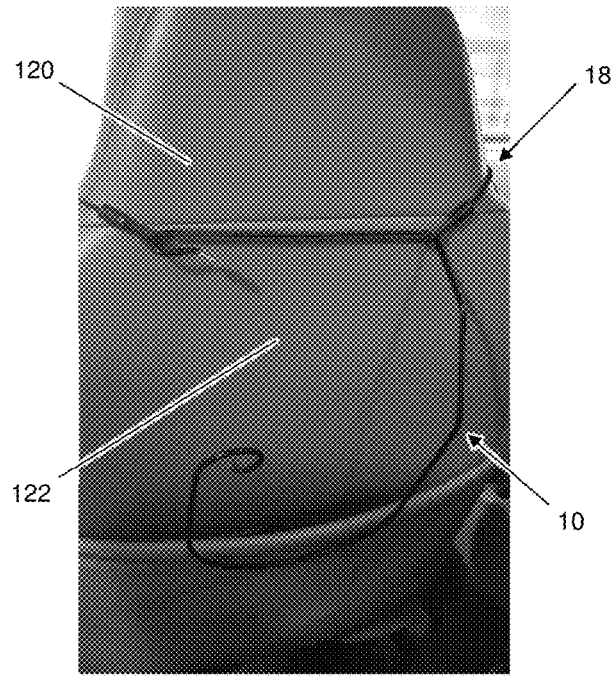
FIG. 3 illustrates the hat hanger mounted to a seatback of a vehicle seat by the elastic strap illustrated in FIG. 1.
Figure 4A:
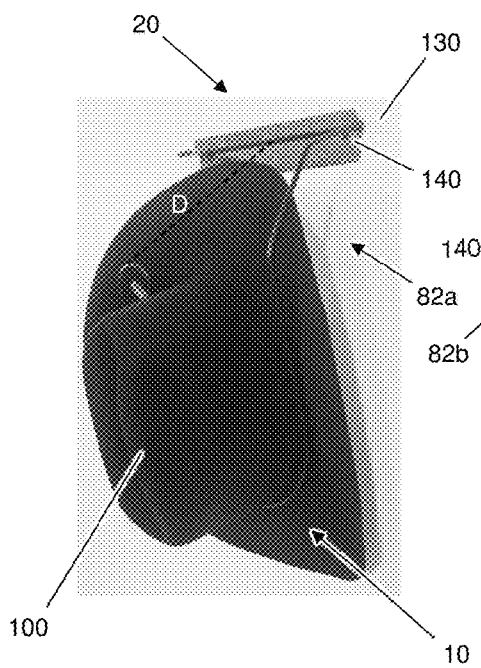
FIGS. 4A and 4B illustrate the hat hanger mounted to a wall by the mounting bracket illustrated in FIG. 1.
Figure 4B:
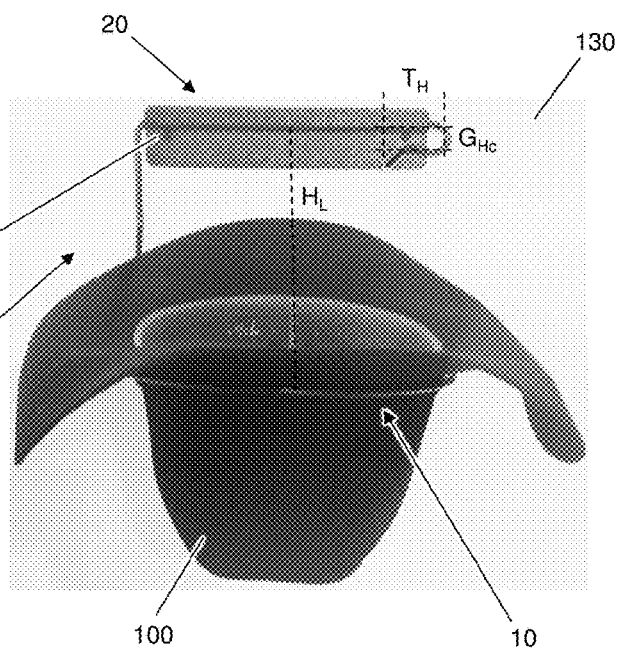

The hat hanger 10 can be mounted directly onto the headrest posts 110 of a car seat 120 as shown in FIG. 2 or may be mounted to seats without headrest posts using an elastic strap 18 as shown in FIG. 3. In FIGS. 2 and 3, the hat hanger is shown at the backside of the seat 120, and the hat hanger can alternatively be positioned on the front of the seat. The hat hanger can also be mounted to a wall 130 with a bracket 20 that is secured to the wall with fasteners 140, such as screws, as shown in FIGS. 4A and 4B. With the mounting bracket, the hat hanger can be positioned with the loop extending downward toward the wall or with the loop extending outwardly away from the wall as shown in FIGS. 4A and 4B, respectively. Preferably, the hook, arm, and loop are formed by a single, continuous solid strand of wire 22 that is preferably a metal material which is bent into the hanger shape as particularly described below and shown in the drawings; it will also be appreciated that the hanger could be produced in the inventive shape as a single piece through other manufacturing techniques, such as injection molding or 3D printing/additive manufacturing, or may be produced in separate subassemblies that are fastened together.

The hook 12 has a shank section 24, a tip section 26, and a head 28 situated between the shank section and the tip section. The tip section may be straight, with a longitudinal axis parallel to the arm's longitudinal axis as shown in FIGS. 1 and 2 or may have a converging center portion with a flaring end portion as shown in FIGS. 3 and 4. Regardless of the particular shape of the hook's tip section, the throat length ($T_H$) of the hook is measured along the center longitudinal axis of the hook from the inner wall of the head to the end point of the tip section. The converging-flaring tip section could help secure the hook around a headrest post 110 and prevent the hat hanger 10 from being accidentally dislodged from the posts because the converging section produces a constricted gap in the hook with a shorter gap length than for a hook with a straight tip section ($G_{Hc} < G_{Hs}$). It will also be appreciated that the straight tip section could be less expensive to manufacture and could also provide satisfactory performance in securing the hat hanger. The end portion of the tip section may also be surrounded a sheath which can help prevent scraping the seat and/or headrest post to which the hat hanger is attached and may also help secure the hook around the post.

Figure 5:
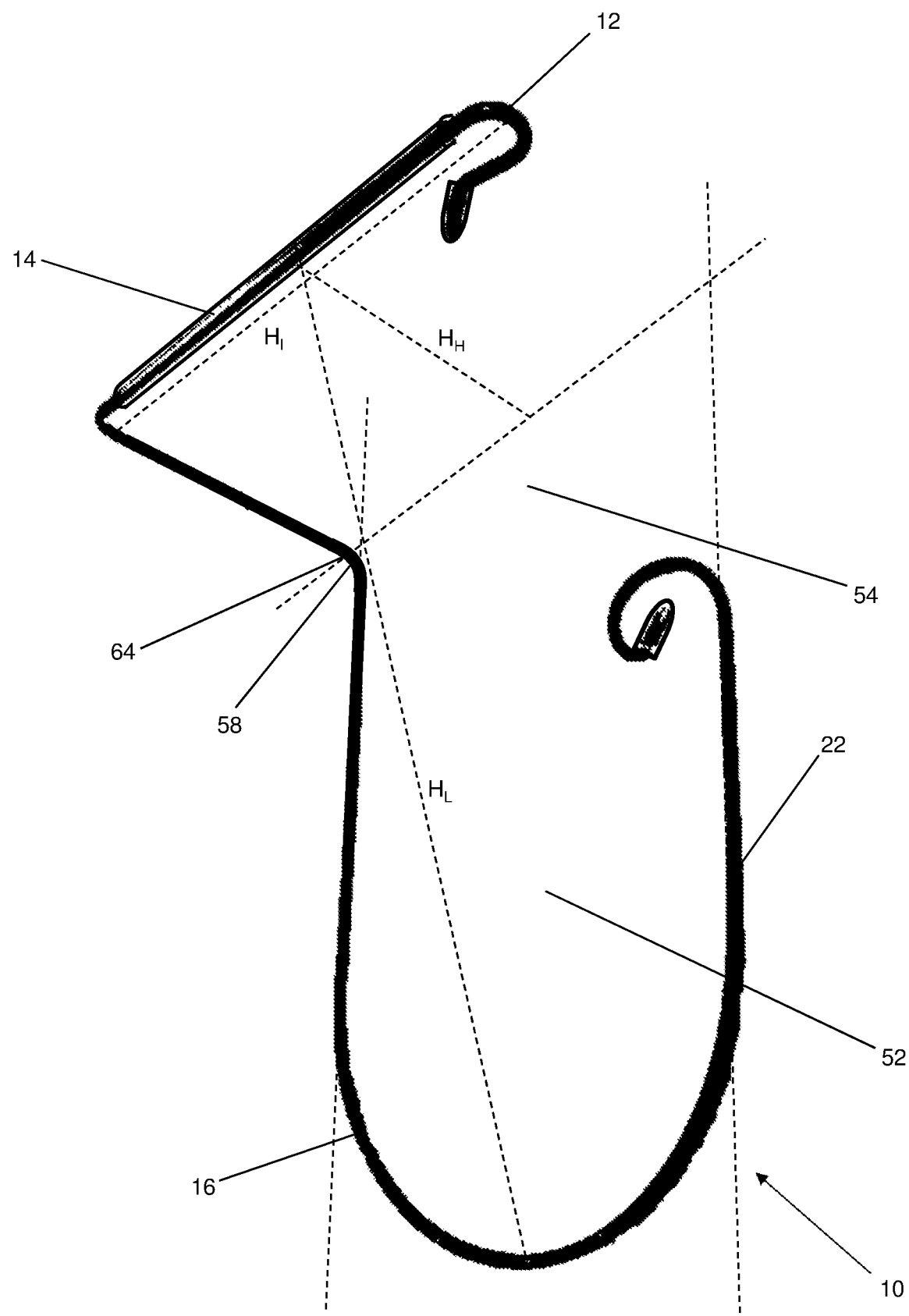
FIG. 5 illustrates a back perspective view of a hat hanger according to a second embodiment.

The arm 14 has a proximal section 30, a distal section 32, and a bend 34 between the proximal and distal sections. The proximal section is a longitudinal portion 14a of the arm that is connected to the shank section 24 of the hook 12 at a proximal end 36 of the arm and extends longitudinally for a length ($A_L$) from the proximal end to the bend in the arm opposite from the head of the hook. The distal section is a lateral portion 14b of the arm that extends for a length ($A_l$) from the bend to a distal end 38 of the arm. The hook's throat length ($T_H$) is preferably greater than half of the arm's lateral length and less than the arm's total lateral length ($A_l > T_H > \frac{1}{2} A_l$), and the arm's lateral length is preferably less than half the arm's longitudinal length ($A_l < A_L$). Each part of the arm is situated in a plane ($P_A$) that is defined by the longitudinal axis 40 of the arm's proximal section 30 and the lateral axis 42 of the arm's distal section 32, i.e., the longitudinal and lateral portions of the arm that have an angle of the bend ($\alpha_b$) between them. The shank section, tip section, and the head of the hook are also preferably situated in the plane of the arm. As shown in FIG. 5, the longitudinal portion of the arm may optionally be surrounded by a cylindrical sheath.

The loop 16 has a neck 44, a nose 46, and a curved crown section 48 situated between the neck and the nose. The neck is connected to the distal section 32 of the arm at the distal end 38 and is angled out of plane of the arm. The curved crown section extends from the neck and turns inwardly, back toward the proximal end of the arm rather than outwardly away from the proximal end of the arm. The nose is situated at the furthest end 50 of the crown opposite from the neck so that by turning the crown inwardly, the nose is positioned closer to the proximal end of the arm whereas if the crown had been turned outwardly, the nose would be positioned further away from the proximal end of the arm. The neck, nose, and crown bound an interior space 52 of the loop, and the loop has a throat length ($T_L$) that is longer than the arm's lateral length ($T_L > A_1$), and the loop's gap length ($G_L$), measured between the neck and the nose, is preferably greater than the arm's lateral length and is less than the combined length of the arm's longitudinal length and the hook's throat length ($T_H + A_L > G_L > A_1$). The loop's gap length preferably has a span that is slightly greater than the arm's longitudinal length ($G_L > A_1$) so that the crown's midpoint (located at its furthest edge) is nearly aligned with the midpoint of the arm's longitudinal portion. The alignment of the midpoints of the crown and the arm (best shown in FIGS. 4B and 5) helps keep the hat hanger stabilized, providing an even distribution of the weight of the hat and loop and avoiding imbalances that might otherwise cause the hanger to rock, especially in a moving vehicle, which could result in the hat hanger losing its grip on the hat and the hat falling from the hat hanger. The nose does not connect back with the arm and instead is spaced a distance (D) apart from the arm's proximal end which produces an open space 54 between the loop's interior space 52 and the arm's proximal section 30. The nose preferably includes a curl 56 that curves inwardly into the loop's interior space.

With the neck angled out of plane of the arm, the loop's crown is situated in a plane ($P_L$) that forms an interior angle ($\alpha_1$) at an intersection with the arm's plane ($P_A$). The interior angle is preferably acute so that the loop's crown plane angles back toward the seatback 122 when the hat hanger 10 is positioned on the headrest posts 110, but the interior angle may be a right angle or slightly obtuse. The loop's neck 44 includes an angled segment 58 that extends a length between the arm's plane and the loop's crown plane to connect the arm's distal section 32 with the curved crown section 48 at the interior angle. As particularly shown in FIGS. 1-4, the angled segment may have a straight section 60 between a pair of bends 62 that form a pair of obtuse interior angles ($\alpha_o$>90°) with the respective planes. The length of the angled segment's straight section ($S_1$) is preferably greater than the arm's lateral length and is less than the arm's longitudinal length ($A_L$>$S_1$>$A_1$). Alternatively, as shown in FIG. 5, the angled segment 58 may be formed with a single continuous bend 64 between the arm's distal section 32 and the loop's curved crown section 48, and in this version of the hat hanger, the angled segment would not have any straight section. As also shown in FIG. 5, a cylindrical sheath preferably made from a soft, pliable plastic or rubber material surrounds most of the arm's longitudinal portion.

The wall mounting bracket 20 has a flat panel 66 that is fastened to the wall 130. A shelf section 68 extends outward from the flat panel to a cantilevered end 70, and a flange 72 projects from the cantilevered end. When the bracket is fastened to the wall, the plane of the bracket's flat panel ($P_B$) is adjacent to and parallel with the plane of the wall. As indicated above and shown in FIGS. 4A and 4B, different orientations of the hat hanger 10 on the bracket 20 result in alternative configurations of the hat hanger and the bracket. In both configurations, the arm's proximal section 30 lays on the shelf section's topside 74 between the flat panel and the flange, and the hook's tip section 26 is positioned on the opposite side 76 of the shelf section that is underneath the topside and the arm's proximal section laying on the shelf. In the configuration 82a shown in FIG. 4A, the arm's distal section 32 is angled away from the bracket's flat panel plane ($P_B$), and the loop's curved crown section 48 is angled back towards the bracket's flat panel plane. In the other configuration 82b shown in FIG. 4B, the hat hanger 10 is flipped (i.e., rotated 180° relative to the vertical axis of the wall) so that the arm's distal section lays adjacent to the bracket's flat panel plane, and the loop's curved crown section is angled away from bracket's flat panel plane. It will be appreciated that in the latter configuration 82b, the hook may engage the flat panel and prevent the arm's distal section from contacting the wall which can protect the wall from being damaged by an indentation of the arm when a hat is placed in the crown.

The elastic strap 18 can be used to mount the hat hanger 10 to seatbacks 110 which do not have headrest posts. The elastic strap has fasteners 78 attached to opposite ends 80 of the strap. The elastic strap wraps around the seatback, and the fasteners respectively connect to the hook and to the bend in the arm to secure the hat hanger to the seat. Preferably, the fasteners are clasps such as halter snaps or snap hooks, and it will be appreciated that other similar spring-biased clasps could be used for the strap's fasteners, including lobster clasps, bolt snaps, carabiners, lever snaps, and trigger snaps. Different types of fasteners could also be used on the ends of the strap, such as hook and loop fasteners and buckles.

The operation of the hat hanger 10 is similar for the mounting arrangements shown in FIGS. 2, 3, and 4A in which the hook 12 and the arm 14 hold the hat hanger to either the seat 120 or the wall 130, and a hat wearer/user rotates the loop 16 away from the seat or the wall to place the crown 102 of the hat in the interior space 52 of the loop. With the brim 104 of the hat positioned on the side of the loop's crown 48 that faces towards the arm, the hat wearer/user allows the loop and hat to rotate back towards the seat or the wall, and the hat's crown is held by the hanger with the brim of the hat positioned between the loop and the seat or the wall. To remove the hat from the hanger or reposition the hat in the hanger, the loop is rotated away from the seat or wall allowing the crown of the hat to be moved within or removed from the interior space of the loop.

When the hat hanger is used with seats 120 that have headrest posts 110, a hat wearer/user does not require any fasteners or other mounting devices so the hat hanger can quickly be removed or repositioned based on a hat wearer/user's desires. For seats that do not have headrest posts, the elastic strap 18 with fasteners can be quickly positioned around the seatback 122 which also allows for quickly removing or repositioning the hat hanger on the seat. Additionally, once the mounting bracket 20 is fastened to the wall 130 in a home, barn, stable, horse trailer, and/or office, the hat hanger is readily portable so it can be interchangeably used in the hat wearer/user's vehicle and at the hat wearer/user's home and/or workspace. As evident from the interchangeable orientations of the hat hanger in the bracket fastened to the wall, the hat hanger can hold the hat with the brim facing towards the wall or upwards.

The curl 56 in the nose of the loop 16 can be useful in holding hardhats, baseball caps, and other hats that have internal suspension structures and/or straps but do not have a brim around the sides of the crown. In particular, the suspension structures and straps can be held by the curl. The loop can also be used to hold purses or grocery sacks to keep them organized.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the hat hanger is sized for standard sized hats, it will be appreciated that the hanger's size could be varied with the various elements being sized proportionally. With regard to the embodiments of the hat hanger disclosed herein, approximate sizes and angles described above relative to each other are provided: $T_H\approx2"$, $A_L\approx7"$, $A_1\approx3"$, $S_1\approx4"$, $T_L\approx10"$, $G_L\approx8"$, $G_H\approx1.5"$, $\alpha_b\approx90°$, and $\alpha_o\approx130°$. With the curves and bends between the various components of the hat hanger, the longest length of the hat hanger from the arm to the furthest edge of the crown is a little over one foot ($H_L\approx12"$), while its full height measured perpendicularly from the plane of the loop to the arm is about half a foot ($H_H\approx6"$) and its lateral length is under a foot ($H_l=A_L+T_H\approx9"$) that is between the length and the height ($H_L$>$H_l$>$H_H$). Thus, the breadth and scope of the present invention should not be limited by any of the above-described exemplary embodiments, but should be defined only in accordance with the following claims appended hereto and their equivalents.

What is claimed is:

1. A hanger for a hat, comprising:
   a hook comprising a shank section, a tip section, and a head situated between the shank section and the tip section;
   an arm comprising a proximal section, a distal section, and a bend between the proximal section and the distal section, wherein the proximal section is connected to the shank section of the hook at a proximal end of the arm and extends for a first length from the proximal end to the bend in the arm opposite from the head of the hook, wherein the distal section of the arm extends for a second length from the bend to a distal end of the arm, and wherein the proximal section and the distal section of the arm are situated in a first plane; and a loop comprising a neck, a nose, and a curved crown section situated between the neck and the nose, wherein the neck is connected to the distal section of the arm at the distal end and is angled out of the first plane, wherein the curved crown section extends from the neck and turns inwardly back toward the proximal end of the arm, wherein the curved crown seciton of the loop is situated in a second plane forming an interior angle with the first plane of the arm, wherein the neck of the loop is further comprised of an angled segment extending between the first plane of the arm and the second plane of the loop, wherein a first obtuse interior angle is formed between the angled segment and the first plane of the arm, wherein a second obtuse interior angle is formed between the angled segment and the second plane of the loop; wherein the nose is situated at an end of the curved crown section opposite from the neck, wherein the neck, the nose, and the curved crown section bound an interior space, and wherein the nose is spaced a distance apart from the proximal end of the arm producing an open space between the interior space of the loop and the arm.

2. The hat hanger of claim 1, wherein the second length of the distal section of the arm is less than half of the first length of the proximal section of the arm.

3. The hat hanger of claim 2, wherein a throat length of the hook is less than the second length of the proximal section of the arm and is greater than half the second length.

4. The hat hanger of claim 1, wherein a gap length of the loop between the neck and the nose is greater than the second length of the distal section of the arm and less than the combined length of the first length of the proximal section of the arm plus the throat length of the hook.

5. The hat hanger of claim 1, further comprising a wall mounting bracket, wherein the wall mounting bracket comprises a flat panel in a third plane, a shelf section extending outward from the flat panel to a cantilevered end, and a flange projecting from the cantilevered end of the shelf section, wherein the proximal section of the arm lays on the shelf section between the flat panel and the flange, wherein tip section of the hook is positioned on an opposite side of the shelf section from the proximal section of the arm, wherein a first configuration of the arm on the shelf is formed with the distal section of the arm angled away from the third plane of the flat panel and with the curved crown section of the loop angled back towards the third plane of the flat panel, and wherein a second configuration of the arm on the shelf is formed with the distal section of the arm laying adjacent to the third plane of the flat panel and with the curved crown section of the loop angled away from the third plane of the flat panel.

6. The hat hanger of claim 1, wherein the hook, the arm, and the loop are all formed from a single, solid strand of wire.

7. The hat hanger of claim 6, wherein the nose of the loop is further comprised of a curl extending into the interior space of the loop, and wherein the shank section, the tip section, and the head of the hook are situated in the first plane of the arm.

8. The hat hanger of claim 1, further comprising an elastic strap having a first fastener attached to a first end of the elastic strap and a second fastener attached to a second end of the elastic strap, wherein the first fastener connects to the hook, and wherein the second fastener connects to the arm at the bend.

9. A hanger for a hat, comprising:

a hook comprising a shank section, a tip section, and a head situated between the shank section and the tip section, wherein the hook has a throat length;

an arm connected to the shank section of the hook at a proximal end of the arm, wherein a longitudinal portion of the arm extends straight for a first length from the proximal end to a bend in the arm opposite from the hook, wherein a lateral portion of the arm extends for a second length from the bend to a distal end of the arm, wherein the longitudinal portion and the lateral portion of the arm are situated in a first plane, and wherein the second length is greater than the throat length of the hook and is less than the first length of the longitudinal portion of the arm; and a loop comprising a neck, a nose, and a curved crown section situated between the neck and the nose, wherein the neck is connected to the lateral portion of the arm at the distal end and is angled out of the first plane, wherein the curved crown section extends from the neck and turns inwardly back toward the proximal end of the arm, wherein the curved crown seciton of the loop is situated in a second plane forming an interior angle at an intersection with the first plane of the arm, wherein the neck of the loop is further comprised of an angled segment extending between the first plane of the arm and the second plane of the loop, wherein a first obtuse interior angle is formed between the angled segment and the first plane of the arm, wherein a second obtuse interior angle is formed between the angled segment and the second plane of the loop; wherein the nose is situated at an end of the curved crown section opposite from the neck, wherein the neck, the nose, and the curved crown section bound an interior space, and wherein a gap length between the neck and the nose is greater than the second length of the lateral portion of the arm and is less than the combined length of the throat length of the hook plus the first length of the longitudinal portion of the arm.

10. The hat hanger of claim 9, further comprising a wall mounting bracket, wherein the wall mounting bracket comprises a flat panel in a third plane, a shelf section extending outward from the flat panel to a cantilevered end, and a flange projecting from the cantilevered end of the shelf section, wherein the longitudinal portion of the arm lays on the shelf section between the flat panel and the flange, wherein the tip section of the hook is positioned on an opposite side of the shelf section from the longitudinal portion of the arm, wherein a first configuration of the arm on the shelf is formed with the lateral portion of the arm angled away from the third plane of the flat panel and with the curved crown section of the loop angled back towards the third plane of the flat panel, and wherein a second configuration of the arm on the shelf is formed with the lateral portion of the arm laying adjacent to the third plane of the flat panel and with the curved crown section of the loop angled away from the third plane of the flat panel.

11. The hat hanger of claim 9, wherein the hook, the arm, and the loop are all formed from a single, solid strand of wire, and wherein the nose is spaced a distance apart from the proximal end of the arm producing an open space between the interior space of the loop and the arm.

12. The hat hanger of claim 9, further comprising an elastic strap having a first fastener attached to a first end of the elastic strap and a second fastener attached to a second end of the elastic strap, wherein the first fastener connects to the hook, and wherein the second fastener connects to the arm at the bend.

13. A hanger for a hat, comprising:
   a hook comprising a shank section, a tip section, and a head situated between the shank section and the tip section;
   an L-shaped arm connected to the shank section of the hook at a proximal end of the arm, wherein a longitudinal portion of the arm extends straight for a first length from the proximal end to a bend in the arm opposite from the hook, wherein a lateral portion of the arm extends for a second length from the bend to a distal end of the arm, and wherein the longitudinal portion and the lateral portion of the arm are situated in a first plane;
   a J-shaped loop comprising a neck, a nose, and a curved crown section situated between the neck and the nose, wherein the neck is connected to the lateral portion of the arm at the distal end and is angled out of the first plane, wherein the curved crown section extends from the neck and turns inwardly back toward the proximal end of the arm, wherein the curved crown section is situated in a second plane forming an interior angle at an intersection with the first plane of the arm, wherein the intersection between the first plane and the second plane is spaced from the J-shaped loop and does not intersect with any portion of the J-shaped loop, wherein the nose is situated at an end of the curved crown section opposite from the neck, wherein the neck, the nose, and the curved crown section bound an interior space, and wherein the nose is spaced a distance apart from the proximal end of the arm producing an open space between the interior space of the loop and the arm; and
   wherein the hook, the arm, and the loop are all formed from a single, solid strand of wire.

14. The hat hanger of claim 13, wherein the second length of the lateral portion of the arm is less than half of the first length of the longitudinal portion of the arm and is greater than a throat length of the hook, and wherein a gap length between the neck and the nose of the loop is greater than the second length of the lateral portion of the arm and is less than the combined length of the throat length of the hook plus the first length of the longitudinal portion of the arm.

15. The hat hanger of claim 13, wherein the neck of the loop is further comprised of an angled segment extending between the first plane of the arm and the second plane of the loop, wherein a first obtuse interior angle is formed between the angled segment and the first plane of the arm, and wherein a second obtuse interior angle is formed between the angled segment and the second plane of the loop.

16. The hat hanger of claim 13, further comprising at least one of an elastic strap and a wall mounting bracket,
   wherein the elastic strap has a first fastener attached to a first end of the elastic strap and a second fastener attached to a second end of the elastic strap, wherein the first fastener connects to the hook, wherein the second fastener connects to the arm at the bend,
   wherein the wall mounting bracket comprises a flat panel in a third plane, a shelf section extending outward from the flat panel to a cantilevered end, and a flange projecting from the cantilevered end of the shelf section, wherein the longitudinal portion of the arm lays on the shelf section between the flat panel and the flange, wherein the tip section of the hook is positioned on an opposite side of the shelf section from the longitudinal portion of the arm, wherein a first configuration of the arm on the shelf is formed with the lateral portion of the arm angled away from the third plane of the flat panel and with the curved crown section of the loop angled back towards the third plane of the flat panel, and wherein a second configuration of the arm on the shelf is formed with the lateral portion of the arm laying adjacent to the third plane of the flat panel and with the curved crown section of the loop angled away from the third plane of the flat panel.

17. A hanger for a hat, comprising:
   a hook comprising a shank section, a tip section, and a head situated between the shank section and the tip section;
   an arm comprising a proximal section, a distal section, and a bend between the proximal section and the distal section, wherein the proximal section is connected to the shank section of the hook at a proximal end of the arm and extends for a first length from the proximal end to the bend in the arm opposite from the head of the hook, wherein the distal section of the arm extends for a second length from the bend to a distal end of the arm, and wherein the proximal section and the distal section of the arm are situated in a first plane;
   a loop comprising a neck, a nose, and a curved crown section situated between the neck and the nose, wherein the neck is connected to the distal section of the arm at the distal end and is angled out of the first plane, wherein the curved crown section extends from the neck and turns inwardly back toward the proximal end of the arm, wherein the curved crown section of the loop is situated in a second plane forming an interior angle with the first plane of the arm; wherein the nose is situated at an end of the curved crown section opposite from the neck, wherein the neck, the nose, and the curved crown section bound an interior space, and wherein the nose is spaced a distance apart from the proximal end of the arm producing an open space between the interior space of the loop and the arm; and
   a wall mounting bracket, wherein the wall mounting bracket comprises a flat panel in a third plane, a shelf section extending outward from the flat panel to a cantilevered end, and a flange projecting from the cantilevered end of the shelf section, wherein the proximal section of the arm lays on the shelf section between the flat panel and the flange, wherein tip section of the hook is positioned on an opposite side of the shelf section from the proximal section of the arm, wherein a first configuration of the arm on the shelf is formed with the distal section of the arm angled away from the third plane of the flat panel and with the curved crown section of the loop angled back towards the third plane of the flat panel, and wherein a second configuration of the arm on the shelf is formed with the distal section of the arm laying adjacent to the third plane of the flat panel and with the curved crown section of the loop angled away from the third plane of the flat panel.

18. The hat hanger of claim 17, wherein the neck of the loop is further comprised of an angled segment extending between the first plane of the arm and the second plane of the loop, wherein a first obtuse interior angle is formed between the angled segment and the first plane of the arm, and wherein a second obtuse interior angle is formed between the angled segment and the second plane of the loop.

19. A hanger for a hat, comprising:
- a hook comprising a shank section, a tip section, and a head situated between the shank section and the tip section, wherein the hook has a throat length;
- an arm connected to the shank section of the hook at a proximal end of the arm, wherein a longitudinal portion of the arm extends straight for a first length from the proximal end to a bend in the arm opposite from the hook, wherein a lateral portion of the arm extends for a second length from the bend to a distal end of the arm, wherein the longitudinal portion and the lateral portion of the arm are situated in a first plane, and wherein the second length is greater than the throat length of the hook and is less than the first length of the longitudinal portion of the arm;
- a loop comprising a neck, a nose, and a curved crown section situated between the neck and the nose, wherein the neck is connected to the lateral portion of the arm at the distal end and is angled out of the first plane, wherein the curved crown section extends from the neck and turns inwardly back toward the proximal end of the arm, wherein the curved crown section of the loop is situated in a second plane forming an interior angle at an intersection with the first plane of the arm; wherein the nose is situated at an end of the curved crown section opposite from the neck, wherein the neck, the nose, and the curved crown section bound an interior space, and wherein a gap length between the neck and the nose is greater than the second length of the lateral portion of the arm and is less than the combined length of the throat length of the hook plus the first length of the longitudinal portion of the arm; and
- a wall mounting bracket, wherein the wall mounting bracket comprises a flat panel in a third plane, a shelf section extending outward from the flat panel to a cantilevered end, and a flange projecting from the cantilevered end of the shelf section, wherein the longitudinal portion of the arm lays on the shelf section between the flat panel and the flange, wherein the tip section of the hook is positioned on an opposite side of the shelf section from the longitudinal portion of the arm, wherein a first configuration of the arm on the shelf is formed with the lateral portion of the arm angled away from the third plane of the flat panel and with the curved crown section of the loop angled back towards the third plane of the flat panel, and wherein a second configuration of the arm on the shelf is formed with the lateral portion of the arm laying adjacent to the third plane of the flat panel and with the curved crown section of the loop angled away from the third plane of the flat panel.

20. The hat hanger of claim 19, wherein the neck of the loop is further comprised of an angled segment extending between the first plane of the arm and the second plane of the loop, wherein a first obtuse interior angle is formed between the angled segment and the first plane of the arm, and wherein a second obtuse interior angle is formed between the angled segment and the second plane of the loop.

* * * * *